US010305596B2

United States Patent
Gottwald et al.

(10) Patent No.: US 10,305,596 B2
(45) Date of Patent: May 28, 2019

(54) DATA PROCESSING OF AN OPTICAL NETWORK ELEMENT

(75) Inventors: Erich Gottwald, Holzkirchen (DE); Harald Rohde, Munich (DE); Thomas Treyer, Munich (DE)

(73) Assignee: Xieon Networks S.à.r.l., Luxembourg (LU)

( * ) Notice: Subject to any disclaimer, the term of this patent is extended or adjusted under 35 U.S.C. 154(b) by 0 days.

(21) Appl. No.: 14/356,791

(22) PCT Filed: Sep. 7, 2012

(86) PCT No.: PCT/EP2012/067485
§ 371 (c)(1),
(2), (4) Date: Sep. 12, 2014

(87) PCT Pub. No.: WO2013/068150
PCT Pub. Date: May 16, 2013

(65) Prior Publication Data
US 2015/0003838 A1 Jan. 1, 2015

(30) Foreign Application Priority Data
Nov. 8, 2011 (EP) ..................... 11188319

(51) Int. Cl.
*H04J 14/02* (2006.01)
*H04B 10/40* (2013.01)
(Continued)

(52) U.S. Cl.
CPC .......... *H04B 10/40* (2013.01); *H04B 10/272* (2013.01); *H04B 10/43* (2013.01); *H04B 10/61* (2013.01);
(Continued)

(58) Field of Classification Search
CPC ... H04B 10/40; H04B 10/272; H04J 14/0298; H04J 14/0282
(Continued)

(56) References Cited

U.S. PATENT DOCUMENTS 5,144,467 A * 9/1992 Kitajima ................ H04B 10/60
398/203
5,815,295 A * 9/1998 Darcie ................... H04B 10/07
398/49
(Continued)

FOREIGN PATENT DOCUMENTS

WO 2007/135407 A1 11/2007
WO 2010/012308 A1 2/2010
(Continued)

OTHER PUBLICATIONS

International Search Report and Written Opinion for Application No. PCT/EP2012/067485, 11 pages, dated Dec. 7, 2012.

*Primary Examiner* — Oommen Jacob
(74) *Attorney, Agent, or Firm* — Nelson Mullins Riley & Scarborough LLP

(57) ABSTRACT

A method for data processing of an optical network unit is provided, the method comprising the steps of receiving a configuration information at the optical network unit, adjusting a light signal to a wavelength or wavelength range indicated by the configuration information, demodulating an incoming optical signal by means of the light signal, mixing the demodulated incoming optical signal with a signal generated by an oscillator and generating a modulated optical upstream signal modulating the light signal by means of a software radio, so that the resulting optical upstream frequency can be shifted with respect to the frequency of the local oscillator by a programmable amount. Furthermore, an
(Continued)

according device and a communication system are suggested comprising at least one such device.

13 Claims, 2 Drawing Sheets

(51) Int. Cl.
    *H04B 10/272* (2013.01)
    *H04B 10/43* (2013.01)
    *H04B 10/61* (2013.01)

(52) U.S. Cl.
    CPC ........ *H04J 14/025* (2013.01); *H04J 14/0247* (2013.01); *H04J 14/0282* (2013.01); *H04J 14/0298* (2013.01)

(58) Field of Classification Search
    USPC ....................... 398/135, 58, 27, 76
    See application file for complete search history.

(56) References Cited

U.S. PATENT DOCUMENTS

| | | | | |
|---|---|---|---|---|
| 2001/0015837 | A1* | 8/2001 | Hung | H04J 14/02 398/79 |
| 2005/0213977 | A1* | 9/2005 | Ikushima | H04J 14/0298 398/79 |
| 2006/0223578 | A1* | 10/2006 | Conyers | H04B 1/406 455/557 |
| 2007/0165745 | A1* | 7/2007 | Fonden | H03F 1/3247 375/297 |
| 2009/0103924 | A1* | 4/2009 | Kawanishi | G02F 1/2255 398/115 |
| 2010/0041357 | A1* | 2/2010 | Wang | H04L 27/0014 455/208 |
| 2011/0206376 | A1* | 8/2011 | Gottwald | H04B 10/516 398/76 |
| 2012/0093502 | A1* | 4/2012 | Gottwald | H04B 10/27 398/27 |
| 2013/0058651 | A1* | 3/2013 | Treyer | H04B 10/60 398/58 |
| 2013/0216228 | A1* | 8/2013 | Nazarathy | H04B 10/272 398/65 |
| 2013/0294219 | A1* | 11/2013 | Peck | H04W 72/0453 370/210 |
| 2015/0003838 | A1* | 1/2015 | Gottwald | H04B 10/272 398/135 |

FOREIGN PATENT DOCUMENTS

| | | | | |
|---|---|---|---|---|
| WO | 2011/110223 | A1 | 9/2011 | |
| WO | WO-2011161637 | A2 * | 12/2011 | ........ H04B 10/272 |
| WO | 2013/068150 | A1 | 5/2013 | |

* cited by examiner

DATA PROCESSING OF AN OPTICAL NETWORK ELEMENT

CROSS-REFERENCE TO RELATED APPLICATIONS

This application is a 35 U.S.C. 371 national stage filing of International Application No. PCT/EP2012/067485, filed on Sep. 7, 2012, which claims priority to and benefit of European Patent Application No. 11188319.5, filed Nov. 8, 2011, the contents of each of which are hereby incorporated by reference herein.

FIELD OF THE INVENTION

The invention relates to a method for data processing of an optical network element as well as to a device. In addition, a communication system is suggested comprising at least one such device.

BACKGROUND OF THE INVENTION

A passive optical network (PON) is a promising approach regarding fiber-to-the-home (FTTH), fiber-to-the-business (FTTB) and fiber-to-the-curb (FTTC) scenarios, in particular as it overcomes the economic limitations of traditional point-to-point solutions.

Several PON types have been standardized and are currently being deployed by network service providers worldwide. Conventional PONS distribute downstream traffic from the optical line terminal (OLT) to optical network units (ONUs) in a broadcast manner while the ONUs send upstream data packets multiplexed in time to the OLT. Hence, communication among the ONUs needs to be conveyed through the OLT involving electronic processing such as buffering and/or scheduling, which results in latency and degrades the throughput of the network.

In fiber-optic communications, wavelength-division multiplexing (WDM) is a technology which multiplexes multiple optical carrier signals on a single optical fiber by using different wavelengths (colors) of laser light to carry different signals. This allows for a multiplication in capacity, in addition to enabling bidirectional communications over one strand of fiber.

WDM systems are divided into different wavelength patterns, conventional or coarse and dense WDM. WDM systems provide, e.g., up to 16 channels in the 3rd transmission window (C-band) of silica fibers of around 1550 nm. Dense WDM uses the same transmission window but with denser channel spacing. Channel plans vary, but a typical system may use 40 channels at 100 GHz spacing or 80 channels at 50 GHz spacing. Some technologies are capable of 25 GHz spacing. Amplification options enable the extension of the usable wavelengths to the L-band, more or less doubling these numbers.

Optical access networks, e.g., coherent Ultra-Dense Wavelength Division Multiplex (UDWDM) networks, are deemed to be used as a future data access.

Upstream signals may be combined by using a multiple access protocol, e.g., time division multiple access (TDMA). The OLTs "range" the ONUs in order to provide time slot assignments for upstream communication. Hence, an available data rate is distributed among many subscribers. Therefore, each ONU needs to be capable of processing much higher than average data rates. Such an implementation of an ONU is complex and costly.

Data transmission of spectrally densely spaced wavelengths is utilized by applications such as Next Generation Optical Access (NGOA) systems allowing high data rates of, e.g., 100 Gbit/s.

However, NGOA systems provide symmetric bandwidth in upstream and downstream directions. Hence, NGOA approaches waste a significant amount of resources in case applications mainly utilize an asymmetric bandwidth profile. Such resources wasted in particular comprise: An optical spectrum, a processing capacity of a software radio in an upstream receiver, a packet processing capability in upstream direction, a downstream capacity that cannot be used by other subscribers due to the allocated upstream resources.

On the other hand, the downstream bandwidth of NGOA may be fixed per subscriber, hence bandwidth cannot be dynamically allocated to a specific subscriber for a short period of time.

However, GPON or GEPON are known as applications with an asymmetric bandwidth profile as well as a high overbooking factor. A main disadvantage relates to a ranging procedure and the dynamic bandwidth allocation in upstream direction, which results in transmission delays amounting to 20-100 ms as well as a complex implementation of an according protocol. It is a further disadvantage that the upstream transmitters of the ONUs are switched on and off due to the time-domain multiplexing, resulting in high dynamic requirements at the upstream receiver. As GPON and GEPON do not use heterodyne receivers, the power budget (length, splitting factor) is also limited.

The international application WO 2011/110223 describes a system where the upstream wavelength is locked to the downstream wavelength, and in which an oscillator and a mixer form an additional stage in the receive path which shifts the intermediate frequency.

The problem to be solved is to overcome the disadvantages stated above and in particular to provide an efficient approach of an asymmetric NGOA system, which is also compatible with GPON systems.

SUMMARY OF THE INVENTION

This problem is solved according to the features of the independent claims. Further embodiments result from the depending claims.

In order to overcome this problem, a method is provided for data processing of an optical network unit, the method comprising the steps of receiving a configuration information at the optical network unit, adjusting a light signal to a wavelength or wavelength range indicated by the configuration information, demodulating an incoming optical signal by means of the light signal, mixing the demodulated incoming optical signal with a signal generated by an oscillator and generating a modulated optical upstream signal modulating the light signal by means of a software radio, so that the resulting optical upstream frequency can be shifted with respect to the frequency of the local oscillator by a programmable amount.

The signal of the oscillator may be a frequency.

The incoming signal can be demodulated utilizing a light sensor, e.g., a photo diode.

The optical signal (or the light source emitting said optical signal) has been adjusted as set forth in the configuration information; this setting of the optical signal is used for providing a modulated upstream signal.

This approach can efficiently be used to support symmetrical or asymmetrical optical access systems. The upstream wavelength range can be adjusted to be significantly smaller than the downstream wavelength range. Each optical network unit, e.g. ONU, may allocate a reduced wavelength range for upstream communication. This upstream communication is utilized via the light signal that is adjusted accordingly. Hence, the central unit, e.g., an OLT of the optical network, can receive all upstream communications from several optical network elements wherein the OLT may broadcast information in downstream direction towards the ONUs. Preferably, the downstream information can be conveyed across a large bandwidth compared with the individual upstream bandwidth utilized by each ONU.

In an embodiment, generating the modulated optical upstream signal includes multiplying the light signal by the factor of $e^{-2\pi i \Delta f}$.

The signal of the oscillator can be tuned or adjusted in order to improve the reception, e.g., the signal quality or a signal-to-noise ratio of the incoming signal. This can be achieved by a known mechanism, e.g., a phase-locked-loop (PLL), a frequency scan, etc.

In an embodiment, the light signal is provided by a light source, in particular a laser.

The light source or the laser may be tunable to a predefined or required wavelength.

In another embodiment, the signal of the oscillator is tuned to substantially compensate the adjustment of the light signal.

Hence, the light signal can be set in step based on the configuration information. This light signal can used for upstream modulation purposes. In order to still be able to receive the information that is sent downstream towards the optical network element, the oscillator can be adjusted. Hence, the signal of the oscillator fed to the mixer (where it is combined with the demodulated electrical (incoming) signal can be used to adjust the signal quality of the downstream information processed at the optical network element (i.e. received at the output of the mixer).

It is also an embodiment that the bandwidth of the upstream optical signal is lower than the bandwidth of the incoming optical signal.

Pursuant to another embodiment, the configuration information is provided by a central unit, in particular an optical line termination.

Hence, the light signal (in particular light source or laser) can be adjusted accordingly. The assigned bandwidth (wavelength range) for upstream communication can thus be utilized accordingly.

According to an embodiment, the light signal used for upstream modulation is adjusted to a wavelength or wavelength range indicated by said configuration information by improving a signal quality.

Hence, the adjustment of the light signal, e.g., tuning of a laser or light source, can be done by determining a quality of a signal received. Hence, the light signal can be stepwise adjusted and a signal's quality (e.g., signal-to-noise ratio) can be determined. In case the quality improves, the adjustment can be continued or otherwise reversed. It is noted that several solutions for locking onto a frequency or carrier could be utilized in order to improve the signal quality (e.g., frequency scan, PLL mechanisms or the like).

According to another embodiment, the optical network element is an optical network unit or a subscriber unit of an optical network, in particular a passive optical network.

The problem stated above is also solved by a device comprising a light source providing a light signal;

comprising a receiver to which the light signal is fed, wherein the receiver provides an electrical output signal;

wherein the light source is adjustable to a wavelength or wavelength range provided by a configuration information received;

comprising an oscillator and a mixer, wherein a signal of the oscillator and the electrical output signal from the receiver are conveyed to the mixer and wherein the signal of the oscillator is tunable to improve a reception of the incoming signal at the device;

comprising a modulator to which the light signal of the light source is fed to provide a modulated optical upstream signal.

According to an embodiment, said device is an optical network unit.

According to further embodiment, said device includes a Digital Signal Processor.

According to another embodiment, the signal of the oscillator is tunable to improve a quality, in particular a signal-to-noise ratio of an output signal of the mixer.

Furthermore, the problem stated above is solved by a communication system comprising at least one device as described herein.

DESCRIPTION OF THE INVENTION

Illustrative embodiments will now be described with reference to the accompanying drawings to disclose the teachings of the present invention. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The solution suggested in particular provides a single downstream wavelength for a number of n subscribers and a dedicated upstream wavelength for each subscriber. The single downstream wavelength can be utilized to broadcast information to said n subscribers.

Each ONU may comprise a heterodyne receiver. However, in contrast to known NGOA receivers, the ONUS do not need to be modified. Each ONU may receive a 1 G data stream which can be either Time Domain Multiplexed (TDM) to supply each ONU with its respective data or the downstream data can be OFDM modulated and the assignment of the OFDM time slots and frequencies can be realized in a similar way as it is done, for example, in LTE.

Figure 1:
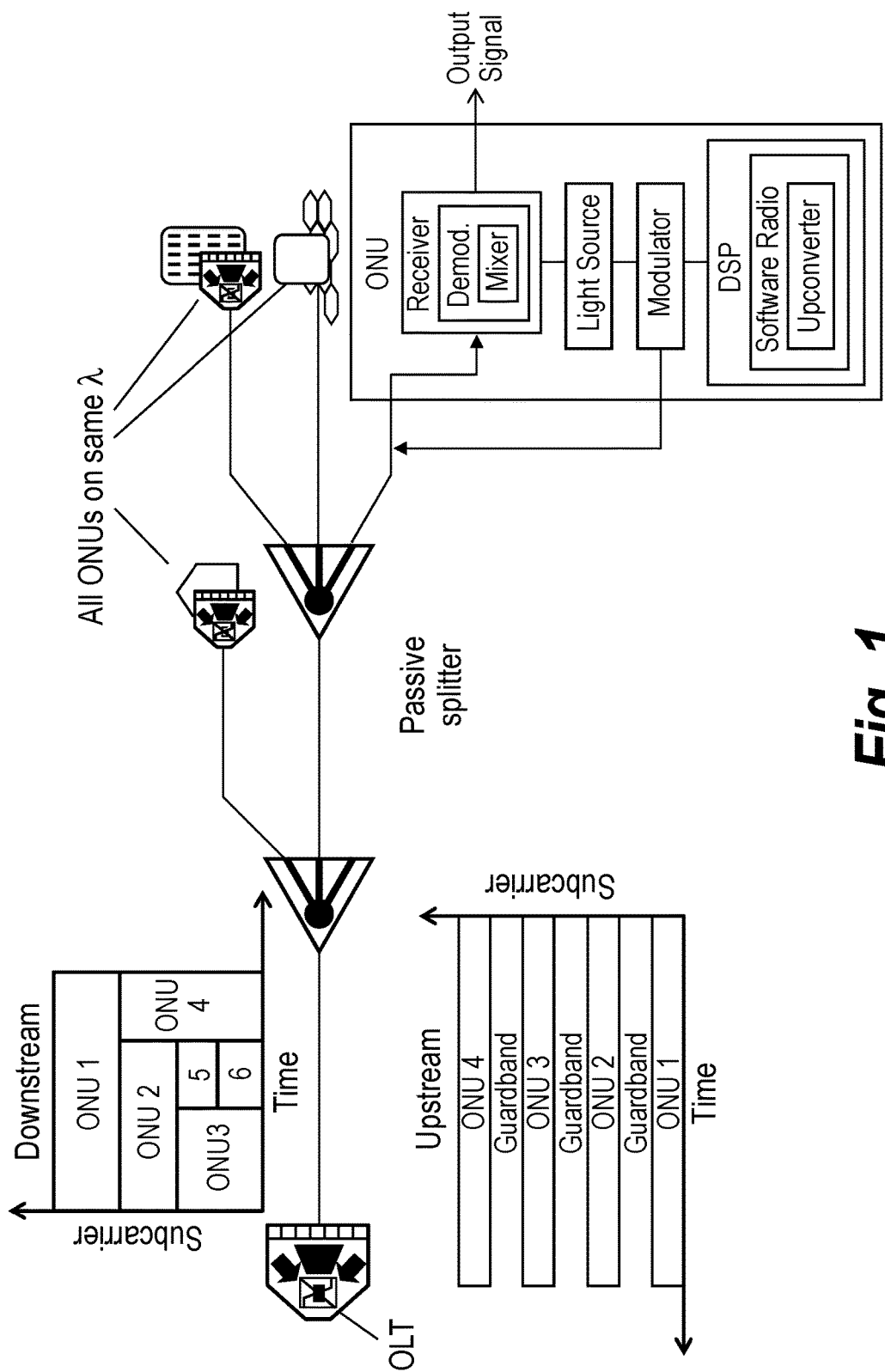
FIG. 1 is a diagrammatic representation of one embodiment of the invention.

FIG. 1 is a diagrammatic representation of one embodiment of the invention. In particular FIG. 1 refers to the OFDM case.

As each ONU contains an IQ modulator for the upstream and sufficiently fast Digital to Analog Converters (DAC) to drive the IQ modulator, any arbitrary optical waveform can be generated on the upstream (within the bandwidth limits of the electronics and the modulator), thus a modulated optical upstream signal which has a certain spectral distance with regard to the ONU local oscillator can be generated. The spectral distance can be determined by software in the ONU Digital Signal Processor (DSP) and can be freely chosen.

Each of the n ONUS which are connected to the same downstream wavelength may be assigned a different spectral distance in order to generate a non-overlapping upstream signal.

Since the NGOA concept allows the ONU local oscillator lasers to drift within certain limits (e.g. a few MHz), the upstream signals from the n different ONUS may be spaced with a certain guardband in between.

The ONUS according to one embodiment of the invention can be used both for 1 G or low speed operation. According to another embodiment of the invention they can be sold first as slow ONUS and then upgraded (e.g. by software) to 1 G operation.

As far as the OLT is concerned, the signals from multiple ONUS on one wavelength can be received as if they came from a single 1 G ONU. All signals can be down converted into the same frequency slot. In this frequency slot, either a 1 G receiver can receive the 1 G signals or, alternatively, a further down conversion stage can down convert the n ONU signals and n receivers can detect the data. With regard to the OLT, the DSP effort may therefore be increased; however, the main effort in the OLT receiver DSP chip goes into the high speed down conversion stage so that the additional effort for n low-speed receivers is limited.

The transmit path of the system according to one embodiment o the invention can employ an hardware comparable to a conventional 1 G symmetrical NGOA ONU without substantial modifications, assuming that the transmit path employs an IQ modulator for the upstream.

However, differently from the conventional art, in one embodiment of the invention, the transmit (upstream) signal can be generated by a software radio.

By a mathematical operation the I-signal and the Q-signal steering the modulator can be manipulated in such a way that the resulting optical upstream frequency can be shifted by a programmable amount.

Therefore the difference between the upstream and the downstream frequency can be generated in the following steps:
  The control loop of the heterodyne reception can create a fixed frequency offset between the downstream signal and the local oscillator (laser) of the ONU. This can be done in the same way and employing the same HW/SW as in a conventional 1 G symmetrical NGOA ONU.
  The transmit signal can be modulated in such a way that the upstream frequency can be shifted by a programmable frequency $\Delta f$ related to the local oscillator laser. This can be done by a complex multiplication of the signal driving the IQ modulator by the factor of $e^{-2\pi i \Delta f}$.
As an effect, the following operations are made possible
The spectral distance can be determined by software in the ONU Digital Signal Processor (DSP) and can be freely chosen.
Each of the n ONUS which are connected to the same downstream wavelength may choose a different spectral distance in order to generate a non-overlapping upstream signal. The spectral distance to the downstream carrier can be, for example, the fixed spectral distance of e.g. 933 MHz$\pm$n*$\Delta f$.

Figure 2:
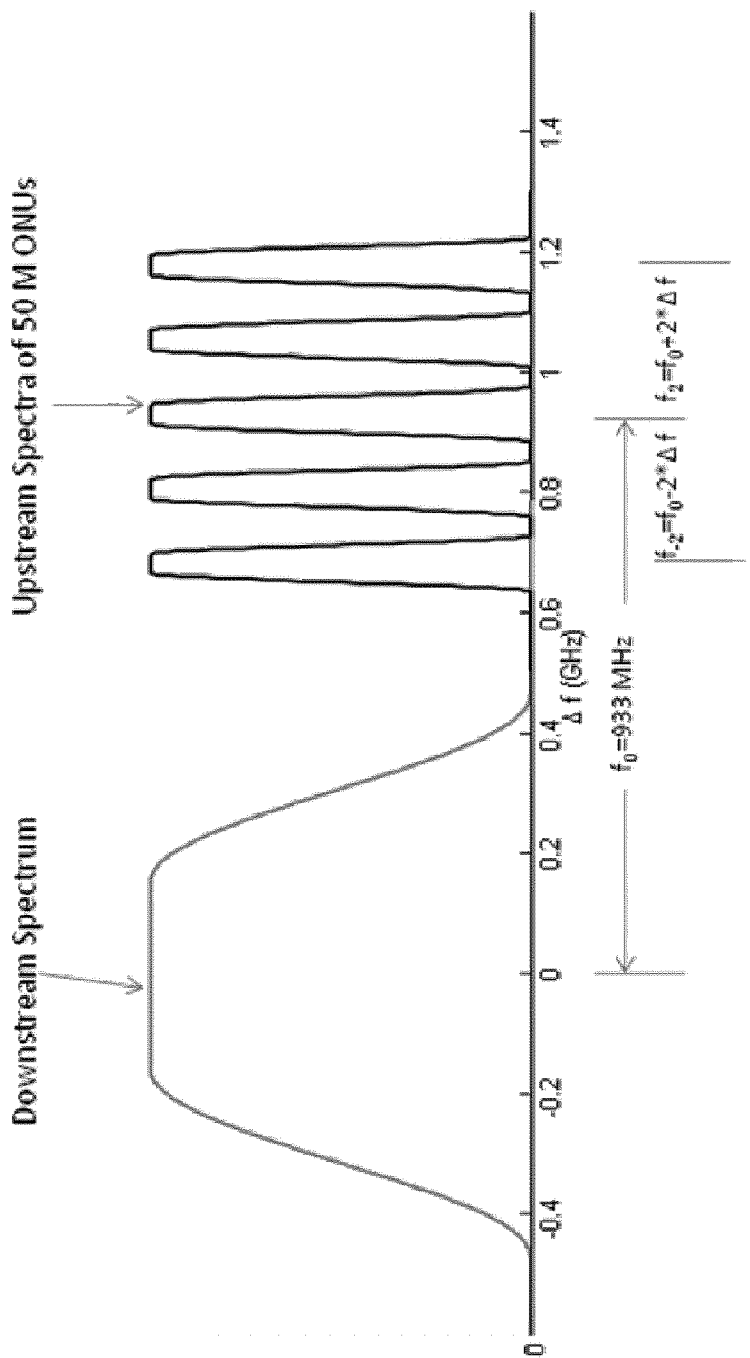
FIG. 2 is a diagrammatic representation of the frequency spectrum for 5 ONUs on a single downstream wavelength according to one embodiment of the invention.

FIG. 2 is a diagrammatic representation of the frequency spectrum for 5 ONUS on a single downstream wavelength according to one embodiment of the invention.

Exemplary ONU Implementation

The hardware of an ONU according to one embodiment of the invention can be comparable to the hardware of a conventional ONU for 1 G ONUS. The DSP may contain a few more blocks, for wample a stage to digitally generate the respective carrier frequency (a Numerically Controlled Oscillator, NCO), a digital up-converter stage (just a complex multiplication) and a modulation stage which can be flexible in its data rate. Furthermore, additional software can control the switching between the data rates and the protocols.

Protocol Layer

The communication protocol utilized may be based on the GPON TC layer and may be a simplified version of it. No upstream bandwidth allocation scheme is needed, because every subscriber (ONU) has a dedicated wavelength. Hence, all subscribers can send upstream traffic simultaneously without any TDM scheme.

In the downstream direction the OLT may assign every ONU a unique ID following a conventional start-up process. The data to the multiple ONUS which are assigned to a single downstream wavelength can be the either time and/or frequency multiplexed, according to conventional TDM or OFDM schemes. After power-up, the ONU can search for the downstream wavelength (according to the NGOA scheme) and can read the configuration parameters from the downstream signal. The Almanac can be enhanced to cope for multiple ONUs on a single wavelength and can be used to assign the respective upstream wavelength.

Further Advantages

The solution suggested offers the same downstream overbooking mechanism as does a GPON or a GEPON and combines it with the heterodyne receivers of NGOA thereby significantly increasing the power budget of the GPON or GEPON.

Also, the solution avoids any problems and complications known from upstream bandwidth allocation schemes utilized in GPON or GEPON.

It is noted that the same ONU can be used for symmetrical NGOA as well as for asymmetrical NGOA.

This approach advantageously allows for significantly reducing hardware complexity and thus costs compared to an OLT used in a symmetrical NGOA.

The approach further enables an asymmetrical NGOA that combines n subscribers in a shared tree with high bandwidth efficiency in the optical domain; all receivers may be frequency selective. Therefore, multiple asymmetrical NGOA trees can be combined in a single fiber and/or PON, extending the number of subscribers by an order of magnitude compared to symmetrical NGOA.

It is further possible to combine symmetrical NGOA and asymmetrical NGOA in the same hardware of an ONU and/or an OLT.

In the same PON, a service provider can combine subscribers with dedicated downstream bandwidth (symmetrical NGOA) and a shared downstream bandwidth (asymmetrical NGOA) according to the approach presented herein.

GPON and/or GEPON ONUs could be used in the same PON, using the same downstream signal, as the upstream signal can be deployed in the 1310 nm range and does not interfere with the NGOA signals. Hence, this solution can be used having both GPON and/or GEPON with the same downstream signal as NGOA.

As may be used herein, the term "substantially" or "approximately" indicates an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise.

Also, the phrases "operably coupled", "coupled with", or "coupled to", as may be used herein, includes direct coupling and indirect coupling via another component, element, circuit, or module where, for indirect coupling, the intervening component, element, circuit, or module does not modify the information of a signal but may adjust its current level, voltage level, and/or power level. Furthermore, inferred coupling (e.g., where one element is coupled with another element by inference) includes direct and indirect coupling between two elements in the same manner as "operably coupled". Finally, the term "compares", as may be used herein, indicates that a comparison between two or more elements, items, signals, etc., provides a desired relationship.

List of Abbreviations:
GEPON Gigabit Ethernet PON
GPON Gigabit PON
IF Intermediate Frequency
NGOA Next Generation Optical Access
OLT Optical Line Termination
ONU Optical Network Unit
PD Photo Diode
PON Passive Optical Network
TC Transmission Convergence
TDM Time Division Multiplexing
UDWDM Ultra Dense WDM

The invention claimed is:

1. A method for data processing of an optical network unit, comprising:
   receiving configuration information at the optical network unit;
   adjusting a light signal to a wavelength or wavelength range indicated by the configuration information;
   demodulating an incoming optical signal by means of the light signal;
   generating a modulated optical upstream signal by modulating the light signal by means of a software radio, wherein a digital signal processor running the software radio contains a digital up-converter stage that is configured to shift a resulting optical upstream frequency with respect to a frequency of the light signal by a programmable amount.

2. The method according to claim 1, wherein the light signal is provided by a laser.

3. The method according to claim 1, wherein generating the modulated optical upstream signal includes multiplying the light signal by the factor of $e^{-2\pi i \Delta f}$.

4. The method according to claim 1, wherein the light signal is adjusted to improve reception of the incoming optical signal and to receive the configuration information.

5. The method according to claim 1, wherein a bandwidth of the modulated optical upstream signal is lower than a bandwidth of the incoming optical signal.

6. The method according to claim 1, wherein the configuration information is provided by an optical line termination.

7. The method according to claim 1, wherein the light signal used for upstream modulation is adjusted to a wavelength or wavelength range indicated by the configuration information by improving a signal-to-noise ratio.

8. The method according to claim 1, wherein the optical network unit is a subscriber unit of a passive optical network.

9. A device, comprising;
   a light source providing a light signal;
   a receiver to which the light signal is fed, wherein the receiver provides an electrical output signal;
   wherein the light source is adjustable to a wavelength or wavelength range provided by a configuration information received;
   a modulator to which the light signal of the light source is fed to provide a modulated optical upstream signal;
   a digital signal processor running a software radio configured for modulating the optical upstream signal, wherein the digital signal processor contains an up-converter stage that is configured to shift the frequency of the optical upstream signal with respect to a frequency of the light source.

10. The device according to claim 9, wherein said device is an optical network unit.

11. The device according to claim 9, further comprising an oscillator generating a signal and wherein the signal of the oscillator is tunable to improve a signal-to-noise ratio of an output signal of the mixer.

12. The method according to claim 1, further comprising mixing the demodulated incoming optical signal with a signal generated by an oscillator.

13. The device according to claim 10, further comprising an oscillator and a mixer, wherein a signal of the oscillator and the electrical output signal from the receiver are conveyed to the mixer and wherein the signal of the oscillator is tunable to improve a reception of an incoming signal at the device.

* * * * *